May 23, 1939.  A. P. BALL  2,159,516
VENTILATOR MECHANISM
Filed Sept. 28, 1936    2 Sheets-Sheet 1
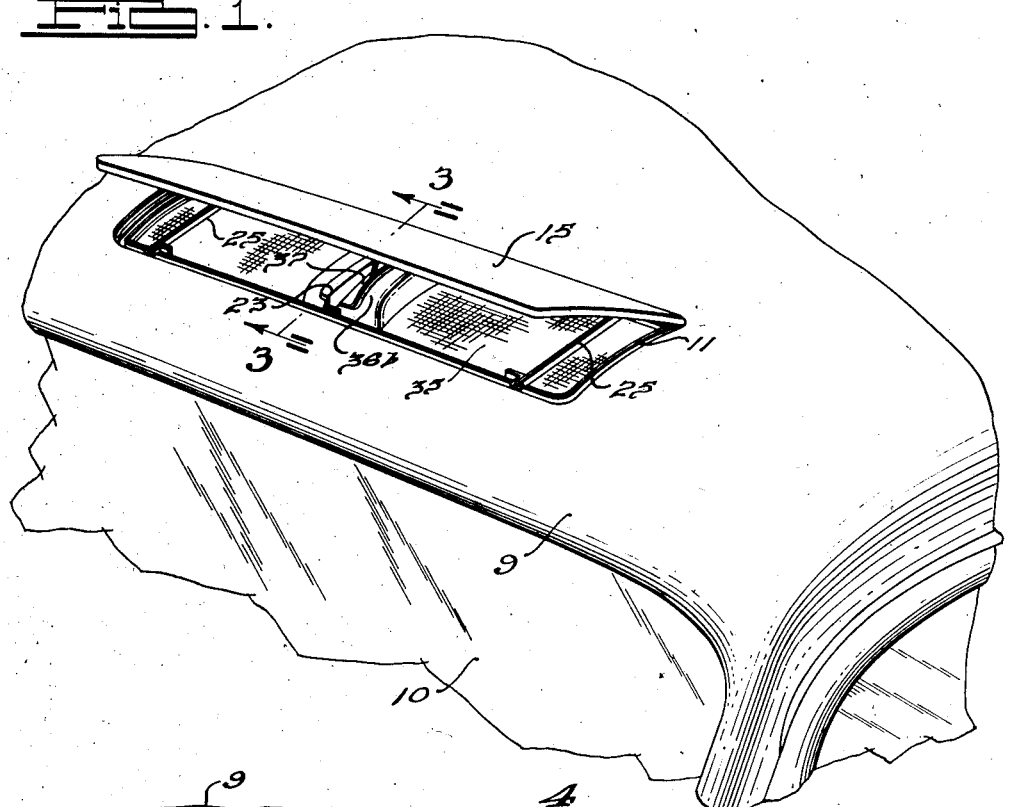
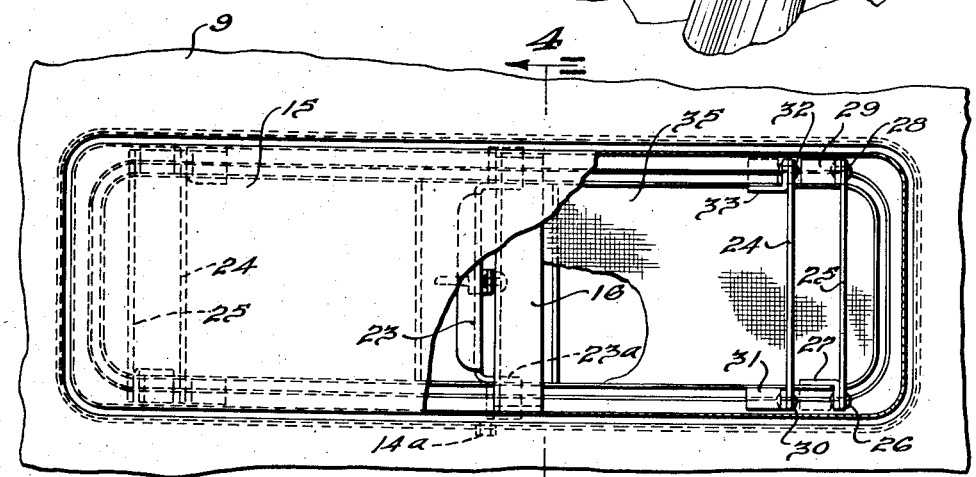
INVENTOR.
Albert P. Ball.
BY
Dike, Calver & Gray
ATTORNEYS.

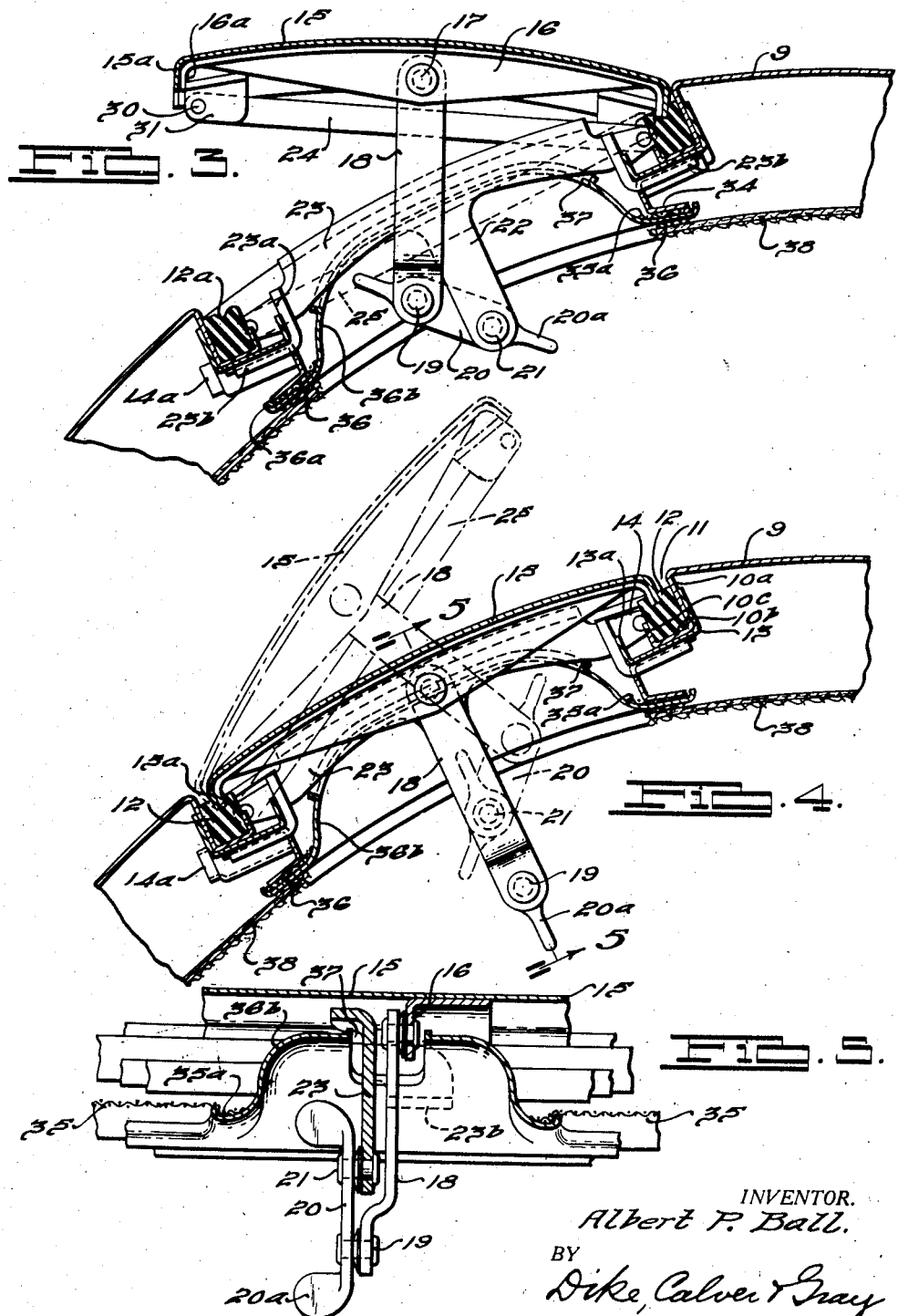

Patented May 23, 1939

2,159,516

UNITED STATES PATENT OFFICE 2,159,516

VENTILATOR MECHANISM

Albert P. Ball, Detroit, Mich., assignor to Briggs Manufacturing Company, Detroit, Mich., a corporation of Michigan Application September 28, 1936, Serial No. 102,882

6 Claims. (Cl. 98—2)

This invention relates to ventilator mechanism for use in motor vehicles and particularly, although not exclusively, in automobiles where it is desired to provide a ventilating means through the medium of which an exchange of air between the interior and exterior of the car may be produced.

An object of the invention is to provide a ventilator for a vehicle body having a ventilating opening therein, such as in the hood, cowl or roof thereof, and a movable lid or closure for the opening adapted to be moved into reverse or different positions permitting either the withdrawal of air from the interior by suction or the deflection of air into the car, whichever may be desired, during the travel of the vehicle in a given direction.

A further object is to provide a ventilator adapted to be installed in the body at a suitable locality, such as above indicated, and having a lid or closure adapted preferably to lie or be disposed substantially flush with the body panel and within the confines thereof when closed and constructed for tilting or swinging movement in reverse directions whereby the lid may in one adjusted position act as a deflector or scoop for directing air into the car and in another adjusted position act as a baffle in the path of the air stream effective to permit withdrawal of air by suction from the car interior.

Other objects of this invention will appear in the following description and appended claims, reference being had to the accompanying drawings forming a part of this specification wherein in like reference characters designate corresponding parts in the several views.

Fig. 1 is a fragmentary perspective view of a portion of an automobile body illustrating a ventilator constructed in accordance with the present invention and mounted in the roof of the vehicle.

Fig. 2 is a plan view thereof, partly broken away.

Fig. 3 is an enlarged section taken substantially through lines 3—3 of Fig. 1 in the direction of the arrows.

Fig. 4 is an enlarged section taken substantially through lines 4—4 of Fig. 2 in the direction of the arrows.

Fig. 5 is a section taken substantially through lines 5—5 of Fig. 4 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, one embodiment of the present invention installed in the metal roof panel of an automobile body adjacent the front end thereof. It will be understood that the ventilator may be installed at other localities in the body and particularly in the hood or cowl. In the broader aspects of the invention, therefore, it will be understood that where reference is made herein to the installation of the ventilator in a wall or panel of a motor vehicle body or the like, it is intended by the use of said terms to refer to any exterior wall or panel, such as the roof, cowl or hood, by which a ventilator lid or closure may be positioned directly in the air stream during the travel of the vehicle in a given direction.

A portion of an automobile body including a metal roof panel 9 and a windshield 10 is illustrated in the drawings. The roof panel or wall 9 is provided with a ventilating opening 11. Around the marginal edges of this opening the metal panel 9 is downwardly flanged at 10a, the lower edge portions of the flanging 10a being bent inwardly at 10b and thence upwardly at 10c to provide a continuous channel extending around the marginal edges of the ventilating opening 11. A sealing strip 12 of relatively soft, pliable material, such as rubber, is fitted within the channel and extends continuously around the edge of the ventilating opening. Secured to the flanging 10a and 10b and also extending continuously around the inner edge of the ventilating opening is a channel member 13, the inner upright flange 13a of which is spaced inwardly from the flange 10c so as to provide a gutter 14 for collecting and draining off water, there being a drain opening at a point 14a in the lower side of the gutter to which a flexible tube may be attached for carrying off the water to a suitable point exteriorly of the body.

Movably mounted within the ventilating opening 11 is a closure or lid 15 which in the present instance comprises a metal stamping having continuous depending marginal flanging 15a adapted to fit into a groove 12a in the rubber sealing strip 12 and embed slightly therein when the lid is closed. In the closed position, as illustrated in Fig. 4, the upper face of the lid 15, which is crowned in two directions, i. e. from front to rear and from one side to the opposite side in accordance with the contour of the roof panel, preferably lies substantially flush with the roof panel 9 and is disposed in the ventilating opening within the confines of the wall or panel 9 when closed. The lid 15 is reenforced by means of a transverse angle bar 16 extending across the under-side thereof and preferably spot welded to the lid, the ends of the rib or reenforcing member 16 being flanged down at 16a to fit against the flanging 15a of the lid. Pivoted at 17 to the depending flange of the bar 16 is a link 18, the lower end of which is pivoted at 19 to one end of a swinging lever or crank arm 20, the opposite end of the latter being pivoted at 21 to the fixed depending arm 22 of a substantially T-shaped bracket 23. The bracket 23 extends centrally across the ventilating opening 11 and intermediate its ends is angular in cross section. The opposite ends of the bracket 23 are bent laterally at 23a and thence flanged at 23b to provide extensions underlying the channel strips 13 and spot welded thereto.

The lid or closure 15 is pivotally connected to the supporting wall at opposite sides thereof through the medium of two sets of control links 24 and 25 through the medium of which the lid may be swung or tilted from closed position reversely into two different open positions, as illustrated in full and dotted lines in Figs. 3 and 4. Similar pairs of links 24 and 25 are provided at each end of the ventilator, these links extending longitudinally of the vehicle. The link 25 is pivoted at 26 to an angle bracket 27 fixed to the channel member 13. The opposite end of this link is pivoted at 28 to an angle bracket 29 spot welded to the inner side of the ventilator panel 15 adjacent the rear edge thereof. The link 24 has its forward end pivoted at 30 to an angle bracket 31, similar to the member 29, spot welded to the under-side of the lid 15 at the forward edge thereof. The opposite end of the link 24 is pivotally connected at 32 to a fixed angle bracket 33 secured to the channel 13 at the rear edge of the ventilating opening.

Secured as by spot welding to the bottom of the channel 13 at suitable intervals are a number of stamped metal spacer members 34. The ventilating opening is preferably covered by means of a fine mesh screen 35, the edges of which engage the lower flanges of the spacers 34. The screen is held in position centrally by means of a stamped metal bracket or retainer strip 36 extending across the opening and adapted to clamp the screen against a pair of the spacer members 34, the ends of the strip 36 being flanged at 36a to extend around the flanged edges of the spacers 34. The member 36 is centrally bowed or dished at 36b thereby holding the central portion of the screen in a similar position to provide clearance for the swinging movement of crank arm 20 within the opening. The strip or bracket 36 has an elongated flanged slot 37 through which the arm 22 and link 18 extend, a similar slot being provided in the screen 35. The marginal edges of the screen which underlap the edges of the ventilating opening and which engage the lower flanges of the spacer members 34 together with the bracket 36 may be retained in position by any suitable means such, for example, as the trim panel 38 which has a central aperture registering with the ventilating opening and the marginal edges of which overlap the screen and ends of the bracket 36 in the manner illustrated in Fig. 4, the trim panel 38 being secured to roof bows or the header of the body in any conventional manner.

With reference to Fig. 4, it will be seen that the crank arm 20 is provided at opposite ends with projecting finger gripping or handle portions 20a. When the crank arm 20 is positioned parallel to the supporting arm 22 and with the pivot 19 in line with the pivots 21 and 17, the lid 15 will be held in its fully closed position, as illustrated in Fig. 4. If the lever is then swung to the left of its dead center position in the manner illustrated in Fig. 3, the link 18 will be elevated at an angle thereby raising the forward edge of the lid, the rear edge of the lid remaining closed and in engagement with the sealing strip 12 by virtue of the control links 25, the lid swinging about the fixed pivots 32 of the links 24. Conversely, when the crank arm 20 is swung from the dead center position of Fig. 4 to the right as illustrated in dotted lines in Fig. 4, the link 18 will raise the rear edge of the lid 15. During this operation the forward edge of the lid will remain in closed position against the sealing strip 12 through the action of the control links 24, the lid tilting about the pivots 30 of the links 24. Thus, by a simple rotative movement of the crank arm 20 in either direction from its dead center or closed position, the lid 15 may be tilted in either direction to raise either the forward or rear edge thereof so as to provide a ventilating opening adjacent either of said edges. When the lid is tilted, as shown in Fig. 3, it will act as a scoop or deflector for directing air through the opening 11 into the vehicle during its forward travel. When, however, the lid is tilted to the dotted line position of Fig. 4 the air stream will be deflected over the lid, which acts as a baffle, thereby producing a low pressure zone in the area adjacent the rear edge of the lid resulting in withdrawing air from the vehicle through the opening 11 by suction. If desired, particularly where the ventilator is used for a cowl or hood ventilator, a remote control lever or rod may be connected to the crank arm 20 and extended to a point adjacent the instrument panel of the automobile so as to permit convenient manipulation of the ventilator lid by the driver of the car.

I claim:

1. In a ventilator for a vehicle body provided with a ventilating opening in a wall thereof, a movable closure for said opening disposed within the confines of said wall when closed, a bracket located within the opening, and means for supporting said closure for movement into angularly related open positions one reverse to the other, said means comprising a pair of pivotally interconnected links, one thereof being connected to said closure at a point approximating the center thereof and the other to said bracket.

2. In a ventilator for a vehicle body having a body panel provided with a ventilating opening, a lid adapted to be positioned within the opening to effect a closure therefor, a fixed bracket located within the opening below the lid, and linkage means interconnecting said lid and said bracket for selectively tilting each of the front and rear edges of the lid upwards to provide a ventilating opening while maintaining the opposite edge substantially closed.

3. In a ventilator for a vehicle body having a body panel provided with a ventilating opening, a swinging lid adapted to be positioned within said opening to effect a closure thereof, a pivotal link connection from one edge portion of the lid to the body adjacent the opposite side of the lid, a pivotal link connection from the opposite edge portion of the lid to the body adjacent the opposite side of the lid, and means for swinging said lid about either pivotal connection.

4. In a ventilator for a vehicle body having a body panel provided with a ventilating opening, a swinging lid adapted to be positioned within said opening to effect a closure thereof, independent pivotal link connections extending in opposite directions from opposite sides of the lid to the body, and means for swinging either side of the lid upwards while maintaining the other side substantially or nearly closed.

5. In a ventilator for a vehicle body having a body panel provided with a ventilating opening, a swinging lid adapted to be positioned within said opening to effect a closure thereof, independent pivotal link connections extending in opposite directions from opposite sides of the lid to the body, and means including a lever for swinging either side of the lid upwards while maintaining the other side substantially or nearly closed.

6. In a ventilator for a vehicle body having a body panel provided with a ventilating opening, a swinging lid adapted to be positioned within said opening to effect a closure thereof, independent pivotal link connections extending in opposite directions from opposite sides of the lid to the body, and means for swinging either side of the lid upwards while maintaining the other side substantially or nearly closed, said means comprising a rotative crank arm having a fixed pivot within said opening and a movable pivotal link connection with said lid adjacent a mid-point of the lid.

ALBERT P. BALL.